United States Patent
Kasetty et al.

(12)

(10) Patent No.: US 10,216,755 B2
(45) Date of Patent: Feb. 26, 2019

(54) MULTI-MASTER TEXT SYNCHRONIZATION USING DELTAS

(71) Applicant: Microsoft Technology Licensing, LLC, Redmond, WA (US)

(72) Inventors: Shruti Kasetty, Redmond, WA (US); Anil Abraham Elson, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1087 days.

(21) Appl. No.: 13/724,844

(22) Filed: Dec. 21, 2012

(65) Prior Publication Data

US 2013/0117220 A1    May 9, 2013

Related U.S. Application Data

(62) Division of application No. 12/711,567, filed on Feb. 24, 2010, now Pat. No. 8,341,224.

(51) Int. Cl.
| | |
|---|---|
| *G06F 15/16* | (2006.01) |
| *G06F 17/30* | (2006.01) |
| *G06F 17/22* | (2006.01) |
| *G06Q 10/10* | (2012.01) |

(52) U.S. Cl.
CPC .... *G06F 17/30168* (2013.01); *G06F 17/2211* (2013.01); *G06F 17/2288* (2013.01); *G06Q 10/101* (2013.01)

(58) Field of Classification Search
CPC .......... G06F 17/2211; G06F 17/30168; G06F 17/2288; G06Q 10/101

USPC .......................................................... 709/205
See application file for complete search history.

(56) References Cited

U.S. PATENT DOCUMENTS

| | | | |
|---|---|---|---|
| 5,515,491 A * | 5/1996 | Bates ................... | G06F 3/0481 715/754 |
| 6,334,141 B1 * | 12/2001 | Varma ................. | H04L 12/1813 709/201 |
| 6,449,622 B1 * | 9/2002 | LaRue .............. | G06F 17/30575 |
| 6,535,892 B1 * | 3/2003 | LaRue .............. | G06F 17/30575 |
| 6,694,336 B1 | 2/2004 | Multer et al. ................. | 707/201 |

(Continued)

OTHER PUBLICATIONS

Deltopia, Inc.; "*DeltaWalker / File, folder comparison & synchronization for Windows*"; 2009; 6 pgs.

(Continued)

*Primary Examiner* — Douglas B Blair (57) ABSTRACT

A server enforces a policy for selecting what received change to process. The non-selected changes are not processed by the server. Instead, after the selected change is processed and is incorporated into the current version of the text, the server sends an update to each of the clients indicating the change made to the current version of text. A client performs a conflict resolution procedure when its change was not processed by the server. The conflict resolution procedure detects the differences between the updated text version and its text change that was not accepted by the server and uses the differences to deduce the intent of the user and come up with a merged version of the text which preserves the intent and avoids data loss. The updated version is then sent back to the server to update the current version of the text.

20 Claims, 4 Drawing Sheets

(56) References Cited

U.S. PATENT DOCUMENTS

| | | | | |
|---|---|---|---|---|
| 6,898,642 B2* | 5/2005 | Chafle | ............... | G06F 17/30168 |
| | | | | 707/E17.007 |
| 7,328,243 B2* | 2/2008 | Yeager | ................... | H04L 29/06 |
| | | | | 707/999.008 |
| 7,461,358 B2* | 12/2008 | Wu | ....................... | G06Q 10/10 |
| | | | | 715/229 |
| 7,627,615 B2* | 12/2009 | McMahon | .......... | G06F 17/2288 |
| 7,680,932 B2 | 3/2010 | Defaix | | |
| 7,792,788 B2 | 9/2010 | Melmon | | |
| 8,090,681 B2 | 1/2012 | Lukiyanov | | |
| 8,200,700 B2* | 6/2012 | Moore | ............. | G06F 17/30575 |
| | | | | 707/791 |
| 8,341,224 B2 | 12/2012 | Kasetty | | |
| 8,453,052 B1* | 5/2013 | Newman | ............. | G06F 17/2211 |
| | | | | 715/255 |
| 2003/0018719 A1* | 1/2003 | Ruths | ....................... | G06F 9/52 |
| | | | | 709/205 |
| 2004/0073581 A1* | 4/2004 | McVoy | ..................... | G06F 8/71 |
| 2004/0133444 A1* | 7/2004 | Defaix | ..................... | G06F 8/71 |
| | | | | 717/122 |
| 2006/0117075 A1 | 6/2006 | Cowan et al. | ................. | 707/203 |
| 2006/0200755 A1* | 9/2006 | Melmon | ............. | H04L 67/1095 |
| | | | | 715/234 |
| 2006/0212846 A1* | 9/2006 | O'Farrell | .................. | G06F 8/20 |
| | | | | 717/116 |
| 2007/0283321 A1* | 12/2007 | Hegde | ....................... | G06F 8/71 |
| | | | | 717/110 |
| 2008/0208869 A1* | 8/2008 | Van Riel | ............. | G06F 17/3089 |
| 2008/0208969 A1* | 8/2008 | Van Riel | ........... | G06F 17/30861 |
| | | | | 709/204 |
| 2009/0006936 A1* | 1/2009 | Parker | ................. | H04L 12/1813 |
| | | | | 715/200 |
| 2009/0157608 A1* | 6/2009 | Strathearn | ......... | G06F 17/30719 |
| 2009/0327358 A1* | 12/2009 | Lukiyanov | ........ | G06F 17/30038 |
| 2011/0153566 A1* | 6/2011 | Larson | ............. | G06F 17/30356 |
| | | | | 707/638 |
| 2012/0212762 A1* | 8/2012 | Tsukuba | ............. | H04N 1/00347 |
| | | | | 358/1.13 |

OTHER PUBLICATIONS

Perforce Software; "*Perforce Visual Merge Tool—Locate and resolve conflicts quickly*"; Sep. 24, 2009; 2 pgs.

"*Sun WorkShop TeamWare User's Guide*"; accessed Dec. 9, 2009 at http://docs.sun.com/source/806-3573/merge.html; 9 pgs.

"*Source Control and Merge Tool for MDS/MDD Models*"; accessed Dec. 9, 2009 at http://osera.modeldriven.org/documents/Source%20Control%20and%20Merge%20Tool%20for%20MDS.doc; 18 pgs.

U.S. Appl. No. 12/711,567, Notice of Allowance dated Sep. 19, 2012, 14 pages.

\* cited by examiner

MULTI-MASTER TEXT SYNCHRONIZATION USING DELTAS

RELATED APPLICATIONS

This application is a divisional of and claims priority to application Ser. No. 12/711,567, filed Feb. 24, 2010, entitled MULTI-MASTER TEXT SYNCHRONIZATION USING DELTAS, which is indicated to be issued as U.S. Pat. No. 8,341,224, on Dec. 25, 2012, hereby incorporated in its entirety by reference.

BACKGROUND

In collaborative applications multiple users may simultaneously edit and interact with contextual text data. For example, users may contribute notes or annotations on a canvas or a presentation. This simultaneous modification of text (referred to as co-editing) can result in conflicts. Some schemes for preventing conflicts can result in data loss and/or and undesirable user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Clients may co-edit text that is associated with a collaborative application. Conflicts can result when there are multiple pending changes to the text. A server enforces a policy for determining what received text change to process. For example, the server may execute a policy that processes the first received change to the text. The non-selected pending changes are not processed by the server. Instead, after the selected change is processed and is incorporated into the current version of the text, the server sends an update notification to each of the clients indicating the changes made to the current version of text. When a client that has a pending change to the server that was not processed receives the updated text from the server, the client performs a conflict resolution procedure to update the text change before re-submitting the text change. The conflict resolution procedure detects the differences between the updated text version and its text change, merges the text versions to minimize data loss, and sends the updated version of the text change back to the server to update the current version of the text.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
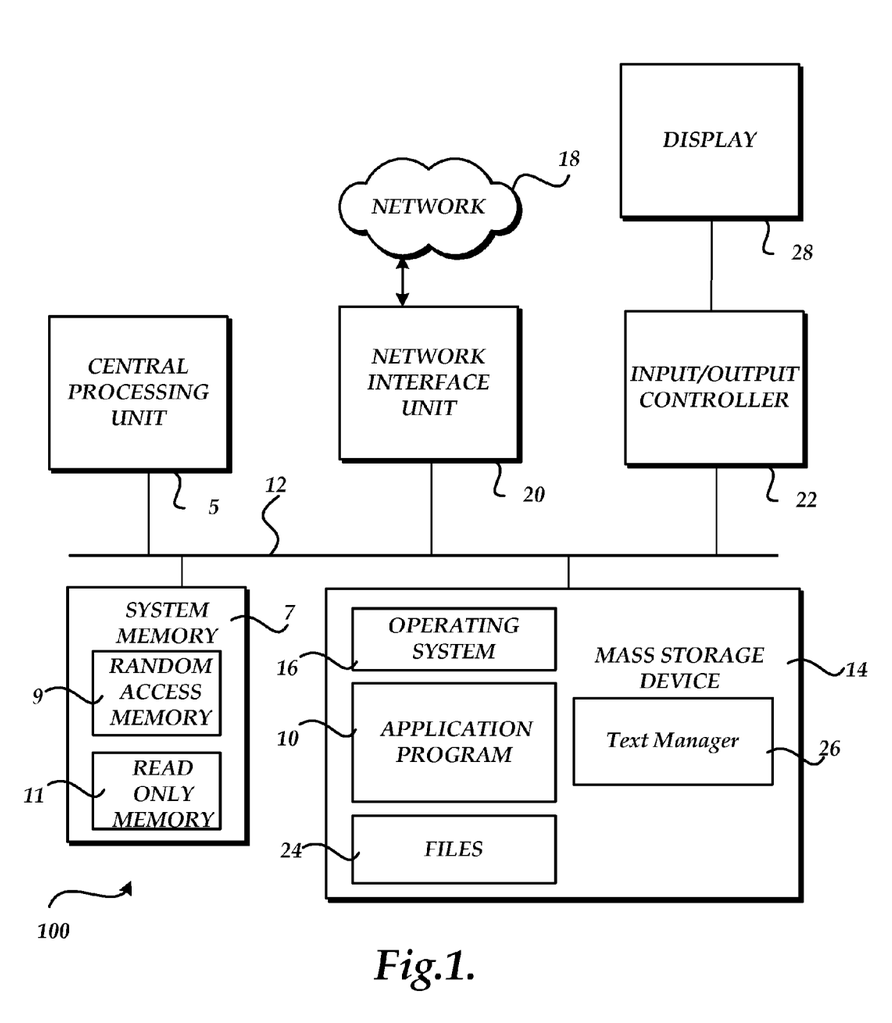
FIG. 1 illustrates an exemplary computing device.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store an application program 10. The application program 10 is operative to interact with a collaborative application that allows co-editing of a document. According to one embodiment, the application program 10 comprises the MICROSOFT ONENOTE application program from MICROSOFT CORPORATION. Other application programs that utilize collaboration from different editors may also be utilized. For instance, email programs, desktop publishing programs, presentation programs, and any other type of program that provides for collaboration may be utilized.

Although text manager 26 is shown separate from application program 10, it may be included within application program 10. As will be described in greater detail below, the text manager 26 is configured to apply a conflict resolution procedure when a text conflict to co-edited text exists between clients. Generally, each client may submit a text change at any time. A server receives the text changes and selects a text change to process. For example, the server may process the first received change. The non-selected pending text changes are not processed by the server. Instead, after the selected text change is processed and is incorporated into the current version of the text, the server sends an update notification to each of the client indicating the text changes made to the current version of text. When a client that has a pending text change to the server that was not selected by the server for processing receives the update notification from the server, text manager 26 on the client performs a conflict resolution procedure before re-submitting the text change to the server. The conflict resolution procedure detects the differences between the updated text version and its text change, merges the text versions to minimize data loss, and sends the updated text change back to the server to update the current version of the text.

Figure 2:
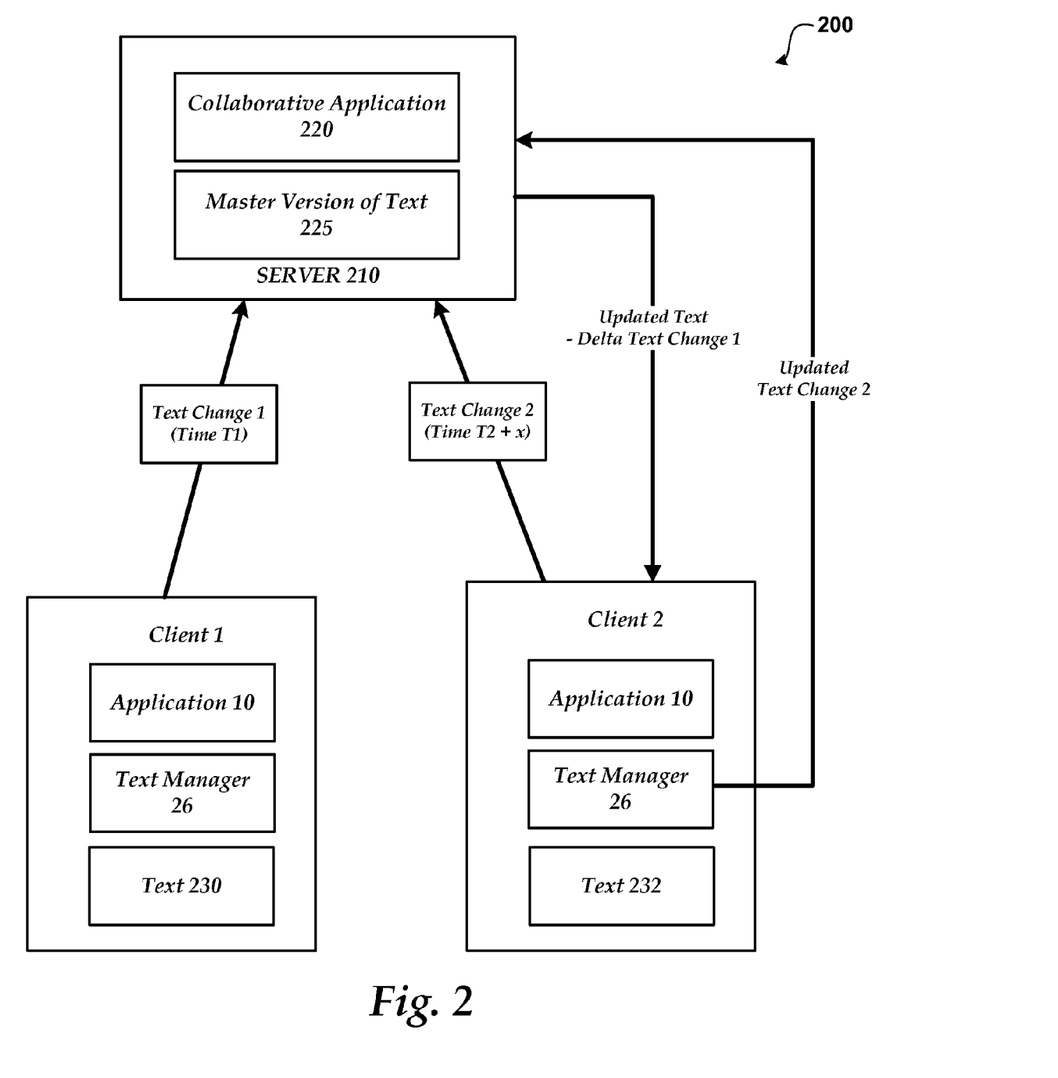
FIG. 2 shows a multi-master text synchronization system.

FIG. 2 shows a multi-master text synchronization system 200. As illustrated, text synchronization system 200 includes clients 1 and 2 that each comprise an application program 10 and text manager 26, and server 210 that comprises collaborative application 220 and master version of text 225.

As briefly described above, the text manager 26 is directed at resolving text conflicts that are made by clients to text. In different collaborative applications, such as online conferences and note taking applications, multiple clients, such as clients 1 and 2, may simultaneously edit and/or view contextual text data that is associated with a collaborative application, such as collaborative application 220. In the current example, server 210 hosts collaborative application 220 and maintains a current master version of the text 225 for the collaborative application. According to one embodiment, each client that interacts with collaborative application 220 also maintains a current version of the text that is kept in synchronization with the master version of text 225. In the current example, text 230 is client's 1 version of the text and text 232 is client's 2 version of the text. Clients 1 and 2 may contribute changes to the text at any time. A conflict between text changes exist when there are two or more text changes that are currently pending for server 220 to process. For example, assume that at time T1, client 1 makes a text change and sends the change to server 210.

Before server 220 can process the change to the master version of text 225 in view of change 1 and broadcasts the change to the other clients, client 2 makes a change to the text and submits text change 2 to server 210 at time t1+x. According to one embodiment, collaborative application 220 on server 210 accepts the first change received and does not process any other changes. In the current example, the first change received is text change 1 from client 1. While a first person wins policy is used according to an embodiment of the invention, other methods of selecting the text change to process may also be used. For example, server 220 may select the change based on a priority associated with a client, a change that results in the most substantive change to the master version of text 225, the least substantive change to the text, and the like. According to one embodiment, the text changes to the text are transferred between the clients and servers as deltas to the current text. The deltas describe the differences between the changed text and the current text that is maintained by the server. The use of deltas is directed at increasing network traffic efficiency.

After server 210 updates the master version of text 225 using selected text change 1, the text change 1 delta is sent to the other clients (in this example, client 2) as an update notification. When a client receives the update notification from the server and the client has a submitted change that has not been processed by the server, the client determines that its change is out of date and a conflict has occurred. Further, any pending text change deltas for the client will be rejected since they are based on an outdated version of the text. In these scenarios, a determination is made to determine the differences between the rejected and/or pending text changes to the current master version of text 225. According to one embodiment, a diff/merge conflict resolution algorithm is executed by text manager 26 when a conflict exists. The diff/merge algorithm determines the differences between its text changes that were either previously submitted and/or pending and merge the client's changes with the updated text change received from server 210. Any algorithm that determines the differences between the text versions may be used. The merge algorithm may work different ways. For example, according to one embodiment, when one or more words changes that is located at the same location, both of the words may be kept. In another example, a conflicting word may be removed. These text change deltas are then submitted to the server, and if accepted, will result in a change notification to the clients. If the text change deltas submitted by a client are rejected again, the process on the client is repeated and updated change deltas are sent again to the server.

Since the conflict resolution procedure is performed on the clients using text manager 26, the server does not need to perform conflict resolution for the conflicting text edits. Instead, any client that has pending changes utilize text manager 26 to modify and re-submit text changes. The resource consumption and processing overhead on the server is also reduced since conflict resolution does not need to be performed on the server. The server may also execute a simple selection policy, such as the first person wins policy, to determine what text edit to process. When the server implements a simple policy, such as the first person wins policy, the server may use less resources (e.g. server does not keep a queue of change requests). Instead, the server can process the first text change request it receives and ignore the other text changes. On the clients, the conflict algorithm may be employed only when conflicts are detected. Further, acknowledgements are not needed for changes from either the server or the clients, resulting in reduced network traffic.

Figure 3:
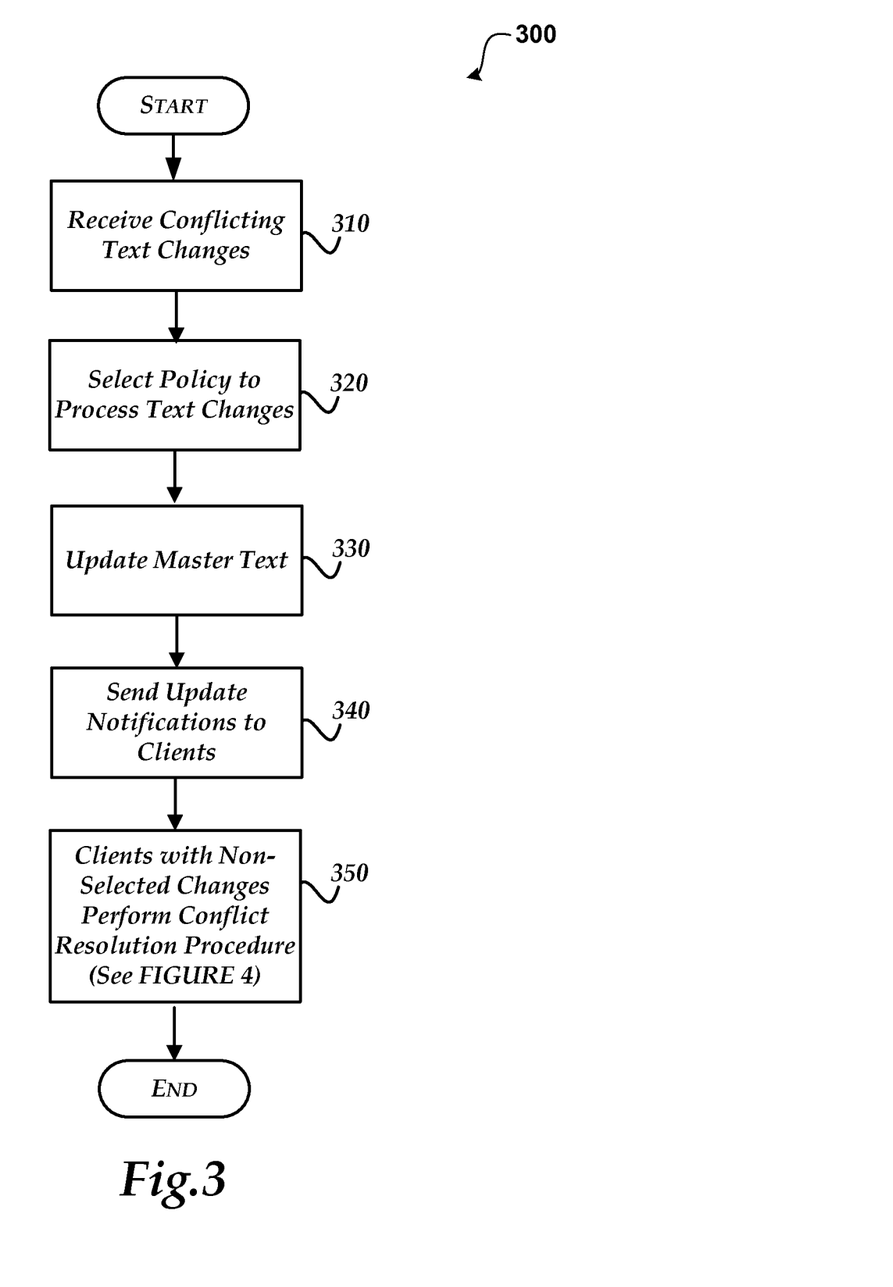
FIG. 3 illustrates a conflict resolution procedure for co-edits to text between a server and clients.
Figure 4:
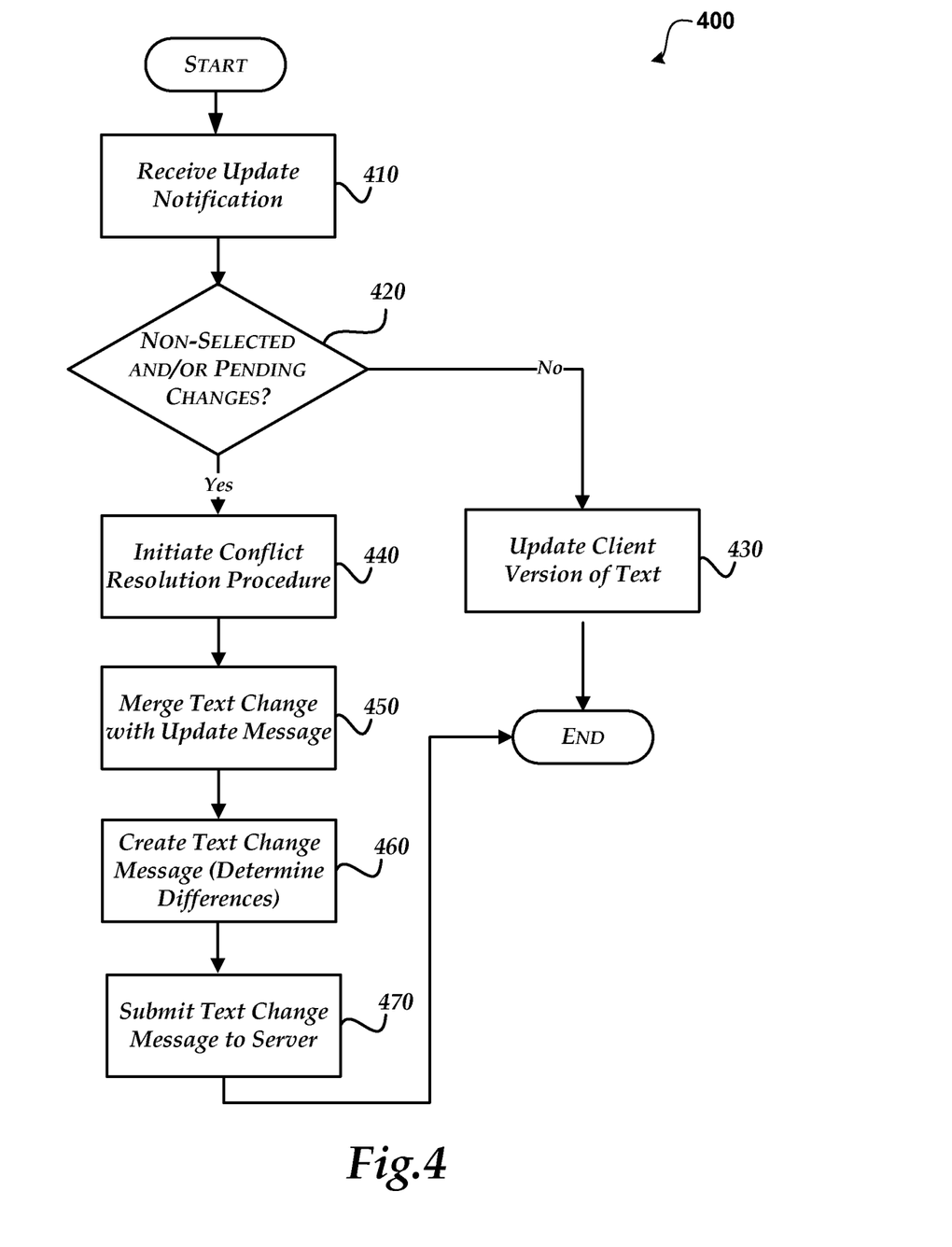
FIG. 4 illustrates a conflict resolution procedure performed on a client for resolving conflicts created during co-editing of text.

Referring now to FIGS. 3 and 4, an illustrative process for resolving conflicts from co-editing of text will be described. Although the embodiments described herein are presented in the context of a text manager 26 and a collaboration application program 10, other types of application programs that allow co-editing of text may be utilized. For instance, the embodiments described herein may be utilized within a word-processing program, a note taking program, a spreadsheet program, a web browser program, and the like.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 illustrates a conflict resolution procedure for co-edits to text between a server and clients.

After a start operation, the process flows to operation 310, where a server receives text edit changes to text from different clients that are conflicting. As discussed above, a text edit change is conflicting when there are two or more text changes that are currently pending to be processed. For example, if a first client submits a text change and a second client submits a text change a conflict would exist after one of the text changes is processed since the current version of the text would not correspond to the text for which the other change was submitted.

Moving to operation 320, a policy is selected to determine what text change to process. According to one embodiment, the selected policy is the first person wins policy that selects the first received text change to process and ignores any of the other text changes that are received before the master text can be updated. Other policies may also be used. For example, a policy may state that when two or more text edits are received within a predefined period of time, the client having a higher priority is processed first. A policy may also set a preference for a type of change made to the text. For example, the policy may prioritize based on where the change is made.

Flowing to operation 330, the text change that is selected is processed. In processing the text change, the master version of the current text is updated to reflect the processed change.

Transitioning to operation 340, after the change has been processed, an update notification message is sent to each of the clients that provides the clients with the text changes. According to one embodiment, the changes are provided in a delta message that indicate a change from the previous version of the master text to the current version of the master text.

Moving to operation 350, any clients that previously sent a text change that was not selected to be processed by the server performs a conflict resolution procedure that integrates the previously sent changes and any pending changes on the client with the updated text that was received in the delta message.

The process then moves to an end operation and returns to processing other actions.

FIG. 4 illustrates a conflict resolution procedure performed on a client for resolving conflicts created during co-editing of text.

After a start operation, the process flows to operation 410, where each of the clients receive an update notification that includes the changes made to the master version of the text for the collaboration application. As discussed above, the update notification may be a delta to a current version of the text.

Moving to decision operation 420, a determination is made by the client receiving the update notification as to whether the client has any non-selected changes and/or pending changes that have not been processed by the server. For example, the client may have submitted a text change that is based on a previous version of the text before the update message was received.

When there are not any non-selected and/or pending changes, the process flows to operation 430, where the client's version of the text is updated to reflect the changes made to the text. In this way, the master version of the text that is maintained by the server is the same as the client's version of the text. The process then moves to an end operation and returns to processing other actions.

When there are non-selected and/or pending changes, the process transitions to operation 440, where the conflict resolution procedure to resolve the text conflicts is initiated on the client.

Flowing to operation 450, a merge text operation is performed. The merge text operation merges the updates included within the update notification with the text included in each of the non-selected and/or pending changes for the client.

Moving to operation 460, the text change message is created that reflects the updated text change in view of the changes made to the master text. As discussed above, according to one embodiment, the text change message is a delta from the current version of the text.

Transitioning to operation 470, the text change is sent to the server. The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for resolving conflicts to co-edited text, comprising:

receiving, at a server that is hosting a master version of the co-edited text, difference notifications from clients that are hosting client versions of the co-edited text, wherein each difference notification of the difference notifications indicates a difference in the co-edited text between a given client version of the co-edited text and the master version of the co-edited text as determined by a given client;

in response to receiving the difference notifications, selecting, at the server, a policy to determine a sole difference notification of the difference notifications to select to process;

selecting, at the server, the sole difference notification of the difference notifications received from the clients to process based on the selected policy;

updating, at the server, the master version of the co-edited text with the selected difference notification to provide an updated master version of the co-edited text reflecting the sole difference notification;

sending an update notification to the clients reflecting the selected difference notification;

receiving, at the server from a conflicted client of the clients, an updated difference notification, wherein the conflicted client transmitted an unselected difference notification to update the master version of the co-edited text that was not selected by the server for provision in the updated master version of the co-edited text, and wherein the updated difference notification reflects a conflict resolution process executed by the conflicted client to reconcile the unselected difference notification and the selected difference notification in a client version of the co-edited text hosted by the conflicted client; and updating, at the server, the updated master version of the co-edited text to reflect the updated difference notification to provide a reconciled master version of the co-edited text.

2. The method of claim 1, wherein the policy is a first person wins policy that selects a first difference notification received at the server.

3. The method of claim 1, wherein the server selects the sole difference notification and ignores any other difference notifications.

4. The method of claim 1, wherein the updated notification sent to the clients comprises deltas to the master version of the co-edited text.

5. The method of claim 1, wherein the conflict resolution process performed by each client is based on the given client version of the co-edited text hosted by the given client and the update notification.

6. The method of claim 1, wherein the conflict resolution process indicates text merges performed by the conflicted client of the non-selected difference notification with the update to the updated master version of the co-edited text.

7. The method of claim 1, wherein the conflict resolution procedure is performed by the conflicted client in response to a determination by the conflicted client that the conflicted client transmitted a non-selected text change to the server.

8. A system for resolving conflicts to co-edited text, comprising:

a processor and a computer-readable storage medium;

an operating environment stored on the computer-readable storage medium and executing on the processor, which causes the system to:

receive, at a server that is hosting a master version of the co-edited text, difference notifications from clients hosting client version of the co-edited text, wherein each difference notification of the difference notification indicates a difference in the co-edited text between a given client version of the co-edited text and the master version of the co-edited text as determined by a given client that is hosting the given client version of the co-edited text;

in response to receiving the difference notifications, select, at the server, a sole difference notification of the difference notifications received by the server to process, wherein the sole difference notification was received from a particular client of the clients that is hosting a particular client version of the co-edited text;

update, at the server, the master version of the co-edited text with the selected sole difference notification to provide an updated master version of the co-edited text that reflects a text change made to the particular client version of the co-edited text made by the particular client;

send an update notification to the clients reflecting the text change;

receive, at the server from a conflicted client of the clients, an updated difference notification, wherein the conflicted client made an unselected difference notification to update the master version of the co-edited text that was not selected by the server for provision in the updated master version of the co-edited text, and wherein the updated difference notification reflects a conflict resolution process executed by the conflicted client to reconcile the unselected difference notification and the selected difference notification in a client version of the co-edited text hosted by the conflicted client; and update, at the server, the updated master version of the co-edited text to reflect the updated difference notification to provide a reconciled master version of the co-edited text.

9. The system of claim 8, wherein the server uses a first person wins policy to select the sole difference notification from among the difference notifications received from the clients.

10. The system of claim 8, wherein the server selects the sole difference notification and ignores any other difference notifications received before the update notification is sent.

11. The system of claim 8, wherein the updated notification sent to the clients comprises deltas to the master version of the co-edited text.

12. The system of claim 8, wherein a conflict resolution procedure is performed by each client of the clients is unique to the given client version of the co-edited text hosted by the given client and the updated notification.

13. The system of claim 8, wherein the conflict resolution process indicates text merges performed by the conflicted client of the non-selected difference notification with the update to the updated master version of the co-edited text.

14. The system of claim 8, wherein the updated notification indicates to the particular client that the particular client does not need to perform the conflict resolution process.

15. A method for resolving conflicts to co-edited text, comprising:

hosting, at a server, a master version of the co-edited text;

distributing, from the server to a first client, a first client version of the co-edited text based on the master version;

distributing, from the server to a second client, a second client version of the co-edited text based on the master version;

receiving, at the server from the first client, a first difference notification indicating changes made to the co-edited text by the first client in the first client version;

receiving, at the server from the second client, a second difference notification indicating changes made to the co-edited text by the second client in the second client version;

in response to receiving at least one of the first difference notification and the second difference notification, selecting a policy to determine which of the first difference notification and the second difference to select;

based on the selected policy, selecting, at the server, the first difference notification;

in response to selecting the first difference notification, discarding, at the server, the second difference notification;

updating, at the server, the master version with the first difference notification to produce a first updated master version of the co-edited text;

sending, from the server to the first client and the second client, a first update notification reflecting the first difference notification;

in response to sending the first update notification to the second client, receiving, at the server from the second client, a third difference notification indicating changes made to the co-edited text by the second client reflecting a conflict resolution process between the second client version and the first difference notification; and updating, at the server, the first updated master version with the third difference notification to produce a second updated master version of the co-edited text.

16. The method of claim 15, wherein the first difference notification indicates a delta between the first client version of the co-edited text and the master version of the text as understood by the first client in response to changes made to the first client version of the co-edited text by the first client.

17. The method of claim 15, wherein the first update notification indicates to the first client that the first difference notification was selected.

18. The method of claim 15, wherein the first update notification indicates to the second client that the second difference notification was not selected and that the conflict resolution process is to be executed by the second client.

19. The method of claim 15, wherein the first difference notification is selected, and the second difference notification is discarded, based on the server receiving the first difference notification before receiving the second difference notification.

20. The method of claim 15, further comprising, after receiving the third difference notification:

receiving, at the server from the first client, a fourth difference notification indicating changes made to the co-edited text by the first client in the first client version after the first difference notification was transmitted by the first client; and in response to selecting the third difference notification, discarding, at the server, the fourth difference notification.

\* \* \* \* \*